United States Patent
Yukizaki et al.

(10) Patent No.: US 10,375,545 B2
(45) Date of Patent: Aug. 6, 2019

(54) COMMUNICATION CONTROL DEVICE

(71) Applicant: DENSO CORPORATION, Kariya, Aichi-pref. (JP)

(72) Inventors: Yasumune Yukizaki, Kariya (JP); Haruhiko Sogabe, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 16/085,079

(22) PCT Filed: Feb. 22, 2017

(86) PCT No.: PCT/JP2017/006454
§ 371 (c)(1),
(2) Date: Sep. 14, 2018

(87) PCT Pub. No.: WO2017/159241
PCT Pub. Date: Sep. 21, 2017

(65) Prior Publication Data
US 2019/0098470 A1 Mar. 28, 2019

(30) Foreign Application Priority Data
Mar. 18, 2016 (JP) ................... 2016-055976

(51) Int. Cl.
H04B 7/00 (2006.01)
H04W 4/46 (2018.01)
H04B 17/309 (2015.01)

(52) U.S. Cl.
CPC ............ *H04W 4/46* (2018.02); *H04B 17/309* (2015.01)

(58) Field of Classification Search
CPC ........... H04W 4/46; H04W 4/48; H04W 4/80; H04B 17/309; G01C 22/00
See application file for complete search history.

(56) References Cited

U.S. PATENT DOCUMENTS

2004/0193372 A1* 9/2004 MacNeille ............. G01C 21/26
701/468
2011/0140968 A1* 6/2011 Bai ........................ G01S 5/0072
342/454

(Continued)

FOREIGN PATENT DOCUMENTS

JP        2013005186 A    1/2013
WO   WO-2017159239 A1    9/2017

(Continued)

*Primary Examiner* — Tuan Pham
(74) *Attorney, Agent, or Firm* — Harness, Dickey & Pierce, P.L.C.

(57) ABSTRACT

A vehicular communication control device includes: a dedicated short range communication processor executing a direct vehicle-to-vehicle communication; a wide area communication processor executing an indirect vehicle-to-vehicle communication; a vehicle data generator, and a peripheral vehicle determination unit determining whether another vehicle is disposed within a predetermined area. The dedicated short range communication processor wirelessly transmits a communication packet including vehicle data in a dedicated short range transmission cycle. The wide area communication processor transmits the communication packet including the vehicle data to a peripheral vehicle in a wide range transmission cycle. The wide area communication processor: selects a first wide area transmission cycle longer than the dedicated short range transmission cycle when no other vehicle is disposed within the area; and selects a second wide area transmission cycle equal to or shorter than the dedicated short range transmission cycle when the other vehicle is disposed within the area.

10 Claims, 6 Drawing Sheets

(56) References Cited

U.S. PATENT DOCUMENTS

2012/0323476 A1   12/2012  Funabashi
2015/0258990 A1*  9/2015  Stettner ................ G01S 17/023
                                                                        701/37

FOREIGN PATENT DOCUMENTS

WO    WO-2017159240 A1   9/2017
WO    WO-2017159242 A1   9/2017

* cited by examiner

COMMUNICATION CONTROL DEVICE

CROSS REFERENCE TO RELATED APPLICATIONS

This application is a U.S. National Phase Application under 35 U.S.C. 371 of International Application No. PCT/JP2017/006454 filed on Feb. 22, 2017 and published in Japanese as WO/2017/159241 A1 on Sep. 21, 2017. This application is based on and claims the benefit of priority from Japanese Patent Application No. 2016-055976 filed on Mar. 18, 2016. The entire disclosures of all of the above applications are incorporated herein by reference.

TECHNICAL FIELD

The present disclosure relates to a communication control device that controls operation of a communication module for performing a vehicle-to-vehicle communication.

BACKGROUND ART

In recent years, a vehicle-to-vehicle communication system has been proposed in which each of multiple vehicles sequentially broadcasts a communication packet (hereinafter referred to as a vehicle information packet) indicating vehicle information such as a current position, a traveling speed, or a traveling direction, and sequentially receives a vehicle information packet transmitted from another vehicle.

As a mode of a communication between vehicles (that is, vehicle-to-vehicle communication) in the vehicle-to-vehicle communication system described above, as disclosed in Patent Literature 1, a mode of directly transmitting and receiving the vehicle information packet between the vehicles over no wide area communication network has been assumed. The direct wireless communication between the vehicles is realized by employing a CSMA/CA (carrier sense multiple access/collision avoidance) method as an access control method.

In addition, vehicle information on the other vehicles obtained by the vehicle-to-vehicle communication is used for a vehicle control that assists driving operation of a driver, a self-driving, information providing to the driver, and the like. For that reason, the vehicle information acquired by the vehicle-to-vehicle communication needs to be real-time information as close as possible to a current situation. In view of such a demand, a transmission cycle of the vehicle information packet is set to several hundred milliseconds (more specifically, 100 milliseconds) in many cases.

PRIOR ART LITERATURES

Patent Literature

Patent Literature 1: JP-2013-5186-A

SUMMARY

When the vehicles implement the direct wireless communication with each other by the CSMA/CA, there is a need to consider well-known problems such as a hidden terminal problem and shadowing by large-size vehicles such as trucks. The hidden terminal problem is a problem that a radio signal interference occurs due to the fact that multiple vehicles are in a positional relationship where the vehicles cannot receive signals from each other. Also, shadowing means that the radio wave is obstructed by the large-size vehicles even though the vehicles are communicatable with each other from the viewpoint of a distance, and the vehicle information packet cannot be temporarily received or the received signal intensity is lowered.

As one solution to solve the above problems, it is conceivable to adopt a configuration in which the vehicles transmit and receive the vehicle information packets to and from each other over the wide area communication network. However, when the vehicles communicate with each other over the wide area communication network, there is a possibility that communication charges corresponding to a communication traffic may be generated. Therefore, when the vehicle-to-vehicle communication is implemented over the wide area communication network, there are a demand for reducing a transmission frequency of the vehicle information packet in order to reduce the communication charges, and a demand for shortening a transmission interval of the vehicle information packet in order to share real-time vehicle information with the respective vehicles, and those demands are contradictory to each other.

It is an object of the present disclosure to provide a communication control device for reducing communication charges while realizing sharing of vehicle information in real time.

According to an aspect of the present disclosure, a communication control device for vehicle includes: a dedicated short range communication processing unit that executes a direct vehicle-to-vehicle communication, which is a direct vehicle-to-vehicle communication without passing through a wide area communication network, with a peripheral vehicle disposed around the vehicle in cooperation with a dedicated short range communication module for executing a direct wireless communication with an external device without passing through the wide area communication network; a wide area communication processing unit that executes an indirect vehicle-to-vehicle communication, which is an indirect vehicle-to-vehicle communication with passing through the wide area communication network, with the peripheral vehicle in cooperation with a wide area communication module for wirelessly communicating with the external device via the wide area communication network; and a vehicle data generation unit that generates vehicle data indicating a traveling state of the vehicle based on a detection result of a sensor mounted on the vehicle. The dedicated short range communication processing unit wirelessly transmits a communication packet including the vehicle data from the dedicated short range communication module in a predetermined dedicated short range transmission cycle. The wide area communication processing unit performs a process of transmitting the communication packet including the vehicle data to the peripheral vehicle via the wide area communication module and the wide area communication network in a predetermined wide range transmission cycle. The communication control device further includes: a peripheral vehicle determination unit that determines whether an other vehicle corresponding to the peripheral vehicle is disposed within a predetermined area determined with reference to a position of the vehicle, based on the vehicle data acquired by the dedicated short range communication processing unit and the wide area communication processing unit. The wide area communication processing unit selects a predetermined first wide area transmission cycle longer than the dedicated short range transmission cycle as the wide area transmission cycle when the peripheral vehicle determination unit determines that no other vehicle is disposed within the predetermined area. The wide area communication processing unit selects a predetermined second wide area transmission cycle equal to or shorter than the dedicated short range transmission cycle as the wide area transmission cycle when the peripheral vehicle determination unit determines that the other vehicle is disposed within the predetermined area.

In the communication control device described above, when it is determined by the peripheral vehicle determination unit that the other vehicle is present within a predetermined range (hereinafter referred to as a peripheral range) that can be regarded as the periphery of the host vehicle, the transmission of the vehicle data by the indirect vehicle-to-vehicle communication is implemented in a first wide area transmission cycle which is relatively long. On the other hand, when it is determined by the peripheral vehicle determination unit that the other vehicle is present within the peripheral range, the transmission of the vehicle data by the indirect vehicle-to-vehicle communication is implemented in a second wide area transmission cycle which is relatively short. The short range communication processing unit sequentially transmits the vehicle data in a predetermined short range transmission cycle regardless of the determination results of the peripheral vehicle determination unit.

According to the above configuration, for example, when there are the peripheral vehicles, the transmission of the vehicle data is performed relatively densely by both of the direct vehicle-to-vehicle communication and the indirect vehicle-to-vehicle communication. Therefore, even if the communication quality of the direct vehicle-to-vehicle communication is deteriorated due to shadowing or the like, sharing of vehicle information in real time can be maintained by the indirect vehicle-to-vehicle communication.

Further, when there is no other vehicle in the peripheral range of the host vehicle, the wide area transmission cycle is set to the first wide area transmission cycle (that is, relatively long time). Lengthening the wide area transmission cycle corresponds to a reduction in a frequency at which the communication is implemented over the wide area communication network, thereby being capable of reducing the communication traffic and the communication charges. When there is no other vehicle in the peripheral range of the host vehicle, the vehicle data of the host vehicle is not used by other vehicles. For that reason, there is little need to frequently transmit the vehicle data. The transmission of the vehicle data is carried out at the same frequency as that when the other vehicles are present in the peripheral range by the direct vehicle-to-vehicle communication with no communication charges.

Therefore, if there is no other vehicle in the peripheral range of the host vehicle, even if the wide area transmission cycle is lengthened, there is little possibility that the real time property of information sharing between the vehicles is impaired. In other words, according to the configuration described above, the communication charges can be reduced while realizing sharing of the vehicle information in real time.

BRIEF DESCRIPTION OF DRAWINGS

The above and other objects, features and advantages of the present disclosure will become more apparent from the following detailed description made with reference to the accompanying drawings. In the drawings.

EMBODIMENTS

Figure 1:
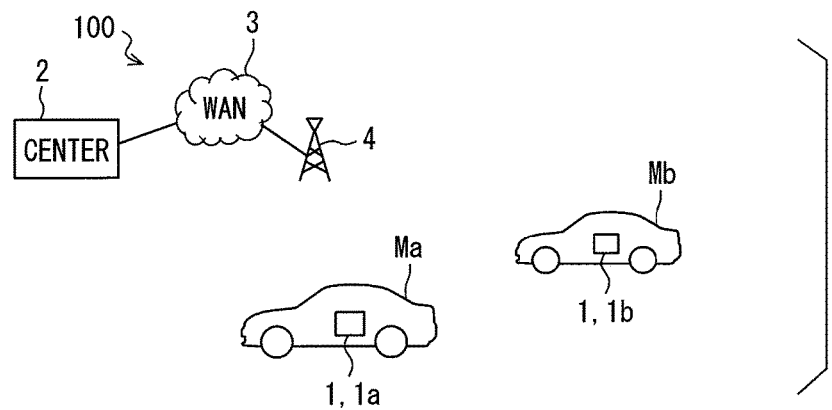
FIG. 1 is a block diagram illustrating an example of a schematic configuration of a vehicle-to-vehicle communication system.

Hereinafter, embodiments of the present disclosure will be described with reference to the accompanying drawings. FIG. 1 is a diagram illustrating an example of a schematic configuration of a vehicle-to-vehicle communication system 100 according to the present disclosure. As shown in FIG. 1, the vehicle-to-vehicle communication system 100 includes multiple vehicle systems 1 installed in respective multiple vehicles Ma and Mb, and a center 2.

In FIG. 1, for the sake of convenience, only two vehicles Ma and Mb are shown as vehicles (hereinafter referred to as applied vehicles) to which the respective vehicle systems 1 are applied, but three or more vehicles are actually present. Hereinafter, in the case of distinguishing the respective vehicle systems 1 installed in the vehicles Ma and Mb from each other, the vehicle system 1 installed in the vehicle Ma is referred to as a vehicle system 1a and the vehicle system 1 installed in the vehicle Mb is referred to as a vehicle system 1b.

<Overall Overview>

The vehicle-to-vehicle communication system 100 is configured to allow the applied vehicles to perform a wireless communication with each other. The applied vehicles travel on a road. The applied vehicles may include four-wheeled vehicles as well as two-wheeled vehicles, three-wheeled vehicles, or the like. The two-wheeled vehicles also include motorized bicycles. In the present embodiment, as an example, the applied vehicles Ma and Mb are four-wheeled vehicles.

Each of the applied vehicles is configured to perform a wireless communication (so-called vehicle-to-vehicle communication) not over a wide area communication network 3 with the use of radio waves having a frequency band allocated in advance. For convenience, the vehicle-to-vehicle communication not over the wide area communication network 3 will be described as direct vehicle-to-vehicle communication in the present specification. A range in which the direct vehicle-to-vehicle communication can be implemented is restricted according to a transmission output of the radio waves. In other words, the range in which the direct vehicle-to-vehicle communication can be implemented is narrower than that of a communication over the wide area communication network. For that reason, the direct vehicle-to-vehicle communication is sometimes called "a dedicated short range communication".

The frequency band used for the direct vehicle-to-vehicle communication may be appropriately designed. For example, the direct vehicle-to-vehicle communication may be realized with the use of radio waves of a 760 MHz band. It is needless to say that the direct vehicle-to-vehicle communication may be realized with the use of other radio waves of 2.4 GHz, 5.9 GHz band or the like.

Any communication standard can be employed for realizing the direct vehicle-to-vehicle communication. In this case, as an example, each of the applied vehicles carries out the direct vehicle-to-vehicle communication according to the standard of a WAVE (wireless access in vehicular environment) disclosed in IEEE 1609 and the like.

Each of the applied vehicles broadcasts a communication packet (hereinafter referred to as a vehicle data packet) indicating its own vehicle data to another vehicle around the host vehicle by the direct vehicle-to-vehicle communication in a predetermined cycle (hereinafter referred to as a dedicated short range transmission cycle) Td. The vehicle data includes transmission source information indicating a vehicle that has transmitted the communication packet (that is, a transmission source vehicle), a generation time of the data, a current position of the transmission source vehicle, a traveling direction, a traveling speed, an acceleration, and the like. The transmission source information is identification information (so-called vehicle ID) previously allocated to the transmission source vehicle to distinguish the transmission source vehicle from other vehicles.

Each of the applied vehicles is configured to be wirelessly connected to the wide area communication network 3 by the vehicle system 1 installed on the vehicle. The wide area communication network 3 in this example refers to a public communication network such as a cellular phone network or the Internet, which is provided by a telecommunications carrier. A base station 4 shown in FIG. 1 is a radio base station for the vehicle system 1 to connect to the wide area communication network 3.

Each of the applied vehicles transmits a communication packet including the same vehicle data as that of the vehicle data packet broadcasted by the direct vehicle-to-vehicle communication to the center 2 through the base station 4 and the wide area communication network 3 in a predetermined cycle (hereinafter referred to as a wide area transmission cycle) Tw.

Hereinafter, in order to distinguish from the vehicle data packet periodically transmitted by the direct vehicle-to-vehicle communication, the communication packet including the vehicle data of the transmission source vehicle transmitted to the center 2 over the wide area communication network 3 is referred to as a wide area vehicle data packet. Also, the vehicle data packet periodically transmitted by the direct vehicle-to-vehicle communication is referred to as a dedicated short range vehicle data packet. However, in the case of not distinguishing the wide area vehicle data packet from the dedicated short range vehicle data packet, each vehicle data packet is simply referred to as a vehicle data packet. In the following description, transmission of the communication packet to another communication terminal (for example, the center 2) connected to the wide area communication network 3 is also expressed as a wide area transmission, and transmission of a predetermined communication packet by the direct vehicle-to-vehicle communication is also expressed as a dedicated short range transmission.

The center 2 has a function of transferring the wide area vehicle data packet transmitted from one vehicle to other vehicles (that is, peripheral vehicles) existing around the transmission source vehicle. An area around the transmission source vehicle is defined as a range within a predetermined transfer vehicle-to-vehicle distance from the vehicle. In other words, the transfer vehicle-to-vehicle distance functions as a parameter used for extracting vehicles (in other words, the peripheral vehicles for the transmission source vehicle) to which the received wide area vehicle data packet is transferred from the various applied vehicles.

The transfer vehicle-to-vehicle distance may be maintained at a fixed value or may be dynamically determined according to the traveling speed of the transmission source vehicle. In this case, as an example, the transfer vehicle-to-vehicle distance is set to a larger value as the traveling speed of the transmission source vehicle is higher. The other vehicles existing within the transfer vehicle-to-vehicle distance from the transmission source vehicle correspond to the peripheral vehicles.

In another mode, the transfer vehicle-to-vehicle distance may be dynamically adjusted to a value corresponding to the type of the road on which the transmission source vehicle is traveling. For example, if the type of a road on which the transmission source vehicle is traveling is an expressway, a transfer vehicle-to-vehicle distance is set to a relatively large value (for example, 400 m). On the other hand, the transfer vehicle-to-vehicle distance when the traveling road is a general road may be set to a value (for example, 200 m) smaller than that when the traveling road is the expressway.

The center 2 has a function of managing the current positions of the respective applied vehicles as a sub-function for determining a transfer destination of the received wide area vehicle data packet. Management of the current position of each applied vehicle may be realized with the use of a database not shown. In the database, the current position of each applied vehicle is stored in association with the vehicle ID or the like. For convenience, data representing the current position of each applied vehicle is referred to as position management data. Each time the center 2 receives the wide area vehicle data packet, the center 2 updates the current position of the transmission source vehicle registered in the database with reference to the content of the wide area vehicle data packet.

When receiving the wide area vehicle data packet transmitted from one applied vehicle, the center 2 extracts the vehicles existing within the transfer vehicle-to-vehicle distance at a straight line distance from the transmission source vehicle based on the position management data, and transfers the received wide area vehicle data packet toward the extracted vehicle.

In this way, the vehicle-to-vehicle communication system 100 provides the indirect vehicle-to-vehicle communication over the wide area communication network 3. In order to distinguish from the direct vehicle-to-vehicle communication, the indirect vehicle-to-vehicle communication over the wide area communication network 3 will be also described below as an indirect vehicle-to-vehicle communication. Hereinafter, a configuration of the vehicle system 1 installed in each vehicle will be described in more detail.

<Configuration of Vehicle System 1>

In this case, a configuration of the vehicle system 1 will be described taking the vehicle system 1a installed in the applied vehicle Ma as an example. The same configuration is applied to the vehicle systems 1 installed in other applied vehicles (for example, the vehicle Mb). For the sake of convenience, the vehicle in which the subject vehicle system 1 is installed (that is, the vehicle Ma) is also described as a host vehicle, distinguishing from the vehicles in which other the vehicle systems 1 are installed.

Figure 2:
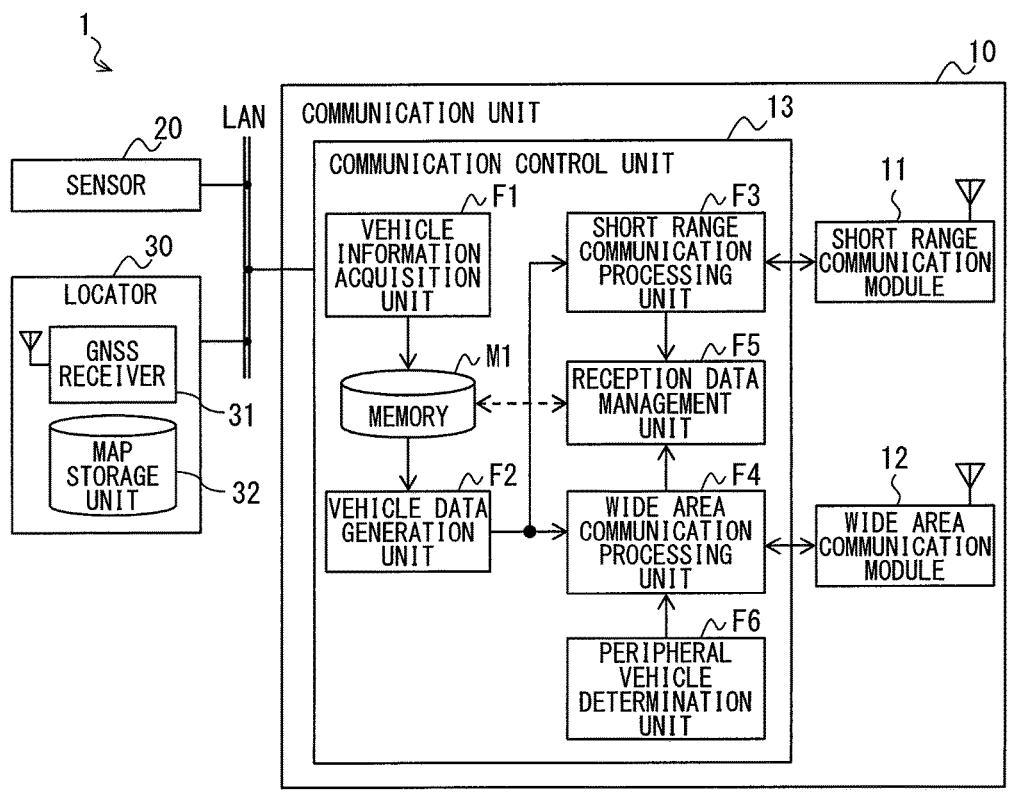
FIG. 2 is a block diagram illustrating an example of a schematic configuration of a vehicle system.

As shown in FIG. 2, the vehicle system 1 includes a communication unit 10, a sensor 20, and a locator 30. The communication unit 10 is connected to the sensor 20 and the locator 30 over a communication network (that is, LAN: local area network) built in the vehicle.

The communication unit 10 is configured to perform transmission and reception of the vehicle data packets with respect to the peripheral vehicles. The communication unit 10 includes a dedicated short range communication module 11, a wide area communication module 12, and a communication control unit 13 as more detailed elements. The dedicated short range communication module 11 and the wide area communication module 12 are connected to the communication control unit 13 so as to be communicatable with each other.

The dedicated short range communication module 11 is configured to perform the direct wireless communication (that is, the direct vehicle-to-vehicle communication) with other vehicles with the use of the radio waves of a predetermined frequency band. The dedicated short range communication module 11 includes a dedicated short range communication antenna and a dedicated short range communication transmission and reception unit not shown as finer elements.

The dedicated short range communication antenna is configured to transmit and receive the radio waves of the frequency band used for the direct vehicle-to-vehicle communication. The dedicated short range communication transmission and reception unit demodulates a signal received by the dedicated short range communication antenna to provide the demodulated signal to the communication control unit 13, and modulates data input from the communication control unit 13 to output the modulated data to the short distance communication antenna and wirelessly transmit the output data. An access control for the direct vehicle-to-vehicle communication is implemented by a CSMA/CA (carrier sense multiple access/collision avoidance). The access control process based on the CSMA/CA may be handled by the dedicated short range communication transmission and reception unit, or may be handled by the communication control unit 13.

The wide area communication module 12 is configured for wirelessly connecting to the wide area communication network 3 and allowing the vehicle system 1 to communicate with another communication device over the wide area communication network 3. The wide area communication module 12 includes a wide area communication antenna and a wide area communication transmission and reception unit not shown as finer elements.

The wide area communication antenna is configured for transmitting and receiving the radio waves of the predetermined frequency band used for the wireless communication with the base station 4. The wide area communication transmission and reception unit demodulates a signal received by the wide area communication antenna to provide the demodulated signal to the communication control unit 13, and modulates data input from the communication control unit 13 to output the modulated data to the wide area communication antenna and wirelessly transmit the output data.

The wide area communication module 12 functions as a communication module that outputs the received data to the communication control unit 13, modulates the data input from the communication control unit 13, and transmits the modulated data to an external device (for example, a center 2) in cooperation with the wide area communication antenna and the wide area communication transmission and reception unit.

The communication control unit 13 controls operation of the dedicated short range communication module 11 and the wide area communication module 12. Details of the communication control unit 13 will be described later separately, but an outline of the communication control unit 13 is described as follows. The communication control unit 13 generates the vehicle data based on the information provided from the sensor 20 and the locator 30 and causes the vehicle data packet including the vehicle data to be transmitted from the dedicated short range communication module 11 or to be transmitted from the wide area communication module 12. The transmission of the communication packet from the dedicated short range communication module 11 corresponds to the dedicated short range transmission described above, and the transmission of the communication packet from the wide area communication module 12 corresponds to the wide area transmission described above. In addition, the communication control unit 13 receives the vehicle data packet transmitted from the peripheral vehicles by the direct vehicle-to-vehicle communication and the indirect vehicle-to-vehicle communication.

The sensor 20 is various sensors for detecting various state amounts relating to the traveling of the host vehicle. The state amounts relating to the travel of the host vehicle are, for example, a traveling speed, a yaw rate, a steering angle, an acceleration, a shift position, and the like. In other words, the sensor 20 includes a speed sensor that detects the traveling speed, a yaw rate sensor that detects the yaw rate, a steering angle sensor that detects the steering angle, an acceleration sensor that detects acceleration acting on the vehicle Ma, a shift position sensor, and the like. The position information indicating the current position of the host vehicle identified by the locator 30, which will be described later, is also included in the state amounts related to the traveling of the host vehicle.

The detection result of the various sensors 20 is sequentially provided to the communication unit 10 over the LAN. The detection results of the various sensors 20 may be provided to the communication unit 10 through any electronic control unit (ECU: electronic control unit). The sensors corresponding to the sensor 20 are not limited to those described above. Also, there is no need to have all of the sensors described above. The type of the sensor 20 may be appropriately designed.

The locator 30 is configured to identify a point where the host vehicle is currently traveling on a road map. The locator 30 includes a GNSS receiver 31 and a map storage unit 32 as finer components.

The GNSS receiver 31 receives a navigation signal transmitted by a navigation satellite provided in a GNSS (global navigation satellite system) which is a satellite navigation system, and sequentially calculates a current position based on the received navigation signal.

The map storage unit 32 stores road map data indicating road connection relationships and road shapes (in other words, road structures). The map storage unit 32 may be realized with the use of a nonvolatile storage medium such as a hard disk drive.

The locator 30 identifies the position of the host vehicle on the road map based on the current position detected by the GNSS receiver 31. Hereinafter, identifying the vehicle position on the road map is also referred to as mapping. Mapping of the vehicle position may be carried out by using a known map matching technique commonly used in navigation apparatuses. The map matching technique is a technique in which a traveling locus of the vehicle is obtained from the traveling direction and the traveling speed of the vehicle at multiple time points, and the traveling locus of the vehicle is compared with the road shape obtained from the map information to obtain the current position of the vehicle.

The locator 30 sequentially provides position information indicating the current position to the communication unit 10. The locator 30 may have the functions described above, and when the navigation device is installed in the host vehicle, the navigation apparatus may be used as the locator 30.

<Configuration of Communication Unit 10>

Next, the communication unit 10 will be described. The communication control unit 13 corresponds to a communication control device. The communication control unit 13 is configured as a computer including a CPU, a RAM, a ROM, an I/O, and a bus line that connects those components to each other. The ROM stores a program (hereinafter referred to as a communication control program) for causing a normal computer to function as the communication control unit 13, a vehicle ID, and the like.

The communication control program described above may be stored in a non-transitory tangible storage medium, and a specific storage medium is not limited to a ROM. For example, the communication control program may be stored in a flash memory. Execution of the communication control program by the CPU corresponds to execution of a method corresponding to the communication control program.

The communication control unit 13 provides various functions shown in FIG. 2 by causing the CPU to execute the above-described communication control program stored in the ROM. In other words, the communication control unit 13 includes, as functional blocks, a vehicle information acquisition unit F1, a vehicle data generation unit F2, a dedicated short range communication processing unit F3, a wide area communication processing unit F4, a reception data management unit F5, and a peripheral vehicle determination unit F6. Further, the communication control unit 13 includes a memory M1 realized by using a rewritable storage medium such as a RAM.

Incidentally, some or all of the functional blocks included in the communication control unit 13 may be implemented with the use of one or plural ICs or the like (in other words, as hardware). In addition, some or all of the functional blocks included in the communication control unit 13 may be realized by a combination of software execution by the CPU with hardware members.

The vehicle information acquisition unit F1 acquires various information (that is, vehicle information) indicating the traveling state of the host vehicle from the sensor 20 and the locator 30 over the LAN. Specifically, the vehicle information acquisition unit F1 acquires the current position, the traveling speed, the yaw rate, the traveling direction, and the like of the host vehicle. Various information acquired by the vehicle information acquisition unit F1 is stored in the memory M1 for a certain period of time.

The vehicle data generation unit F2 generates the vehicle data indicating the traveling state of the vehicle at the generation time in a predetermined generation cycle Tg based on the various information stored in the memory M1. The generation cycle Tg may be, for example, 100 milliseconds. The vehicle data generated by the vehicle data generation unit F2 corresponds to a data body portion (so-called payload) accommodated in the vehicle data packet. The vehicle data generated by the vehicle data generation unit F2 is stored in the memory M1 and provided to the dedicated short range communication processing unit F3 and the wide area communication processing unit F4.

Each time the vehicle data is provided from the vehicle data generation unit F2, the dedicated short range communication processing unit F3 generates a dedicated short range vehicle data packet including the vehicle data and outputs the generated dedicated short range vehicle data packet to the dedicated short range communication module 11. The dedicated short range communication module 11 modulates and broadcasts the dedicated short range vehicle data packet input from the dedicated short range communication processing unit F3.

The vehicle data generation unit F2 generates data in the generation cycle Tg as described above. For that reason, a cycle (that is, a dedicated short range transmission cycle) Td at which the dedicated short range communication processing unit F3 transmits the dedicated short range vehicle data packet is equal to the generation cycle Tg. In other words, in the present embodiment, the dedicated short range transmission cycle Td is set to coincide with the generation cycle Tg.

Further, the dedicated short range communication processing unit F3 acquires data (for example, a dedicated short range vehicle data packet from another vehicle) received by the dedicated short range communication module 11. The dedicated short range communication processing unit F3 provides the vehicle data indicated by the acquired dedicated short range vehicle data packet to the reception data management unit F5. The vehicle data of the other vehicle acquired by the dedicated short range communication processing unit F3 may be provided to another ECU over the LAN.

In the present embodiment, as an example, the vehicle data generation unit F2 spontaneously generates the vehicle data in the predetermined generation cycle Tg and provides the generated vehicle data to the dedicated short range communication processing unit F3 or the like, but the operation of the vehicle data generation unit F2 is not limited to the above operation.

In another mode, the vehicle data generation unit F2 may generate the vehicle data packet based on a request from the dedicated short range communication processing unit F3. In that case, the dedicated short range communication processing unit F3 requests the vehicle data generation unit F2 to generate the vehicle data every dedicated short range transmission cycle Td. Even with such a mode, the dedicated short range vehicle data packet is transmitted in the dedicated short range transmission cycle Td.

The wide area communication processing unit F4 generates the wide area vehicle data packet including the vehicle data generated by the vehicle data generation unit F2 in the predetermined wide area transmission cycle Tw. The wide area communication processing unit F4 generates the wide area vehicle data packet so as to include the same vehicle data as that of the dedicated short range vehicle data packet transmitted at a timing when the wide area transmission cycle Tw expires.

Then, the wide area communication processing unit F4 outputs the generated wide area vehicle data packet to the wide area communication module 12 and wirelessly transmits the output wide area vehicle data packet. In other words, the wide area communication processing unit F4 performs a processing for transmitting the wide area vehicle data packet in the predetermined wide area transmission cycle Tw. The wide area vehicle data packet transmitted from the wide area communication module 12 is delivered to the peripheral vehicles of the host vehicle through the base station 4, the wide area communication network 3 and the center 2.

The cycle (that is, the wide area transmission cycle) Tw per se at which to generate and transmit the wide area vehicle data packet is dynamically changed by the wide area communication processing unit F4. In the present embodiment, a first cycle Tw1 and a second cycle Tw2, which are different in length from each other, are registered in advance in the ROM as setting values that can be adopted as the wide area transmission cycle Tw. The wide area communication processing unit F4 selects one to be adopted as the wide area transmission cycle Tw from the first cycle Tw1 and the second cycle Tw2 based on the determination results of the peripheral vehicle determination unit F6 to be described later. The first cycle Tw1 corresponds to a first wide area transmission cycle and the second cycle Tw2 corresponds to a second wide area transmission cycle.

The first period Tw1 may be set to a value larger than the second cycle Tw2. In this case, as an example, the first cycle Tw1 is set to 10 times (that is, 1 second) as long as the dedicated short range transmission cycle Td, and the second cycle Tw2 is set to 1 time (that is, 100 milliseconds) as long as the dedicated short range transmission cycle Td. It is needless to say that the first cycle Tw1 may be set to 0.5 seconds, 0.8 seconds, 2 seconds, or the like.

However, it is preferable that both of the first cycle Tw1 and the second cycle Tw2 are set to integral multiples of the dedicated short range transmission cycle Td (in other words, the generation cycle Tg of the vehicle data). This is to set the vehicle data indicated by the wide area vehicle data packet transmitted over a wide area to the same content as that of the vehicle data indicated by the dedicated short range vehicle data packet transmitted in a dedicated short range before and after the transmission time point.

In addition, the first cycle Tw1 is a value set in the wide area transmission cycle Tw for the purpose of reducing the communication traffic. Therefore, it is preferable that the first cycle Tw1 is set to a relatively large value from the viewpoint of a reduction in the communication traffic. This is because the communication traffic over the wide area communication network 3 increases more as the wide area transmission cycle Tw is smaller, and the communication charges increase more.

On the other hand, the second cycle Tw2 is a value to be set to the wide area transmission cycle Tw in the case where real-time information sharing between the vehicles is required. Therefore, it is preferable that the transmission cycle of the vehicle information packet is set to a relatively small value (for example, 300 milliseconds or less) from the viewpoint of real-time information sharing. For example, the second cycle Tw2 may be set to 200 milliseconds or 300 milliseconds.

A value of about several hundred milliseconds is assumed as the transmission cycle of the vehicle data packet in the conventional vehicle-to-vehicle communication system. That is, if the transmission cycle is set to 100 ms as in the present embodiment, the real time property of the vehicle-to-vehicle communication is sufficiently secured. In other words, in order to realize the sharing of the vehicle information in real time, the mutual vehicle information has only to be exchanged every several hundred millimeters.

It is needless to say that, in the future, if the real-time property of information sharing between the vehicles is required, a value corresponding to the request may be adopted as the second cycle Tw2. In that case, however, it is also assumed that the generation cycle Tg and the dedicated short range transmission cycle Td of the vehicle data are also set to the length corresponding to the request.

Incidentally, in another mode, the first cycle w1 may be designed to a larger value (for example, 10000 seconds or more) as the transmission of the wide area vehicle data packet is substantially not performed. In other words, the first cycle w1 may be set to a value treated as infinity by the wide area communication processing unit F4. Further, the wide area communication processing unit F4 may be configured not to transmit the wide area vehicle data packet when the wide area transmission cycle is set to the first cycle Tw1.

Further, the wide area communication processing unit F4 acquires data (specifically, a wide area vehicle data packet from another vehicle) received by the wide area communication module 12. The wide area communication processing unit F4 provides the vehicle data indicated by the acquired wide area vehicle data packet to the reception data management unit F5. The vehicle data of the other vehicle acquired by the wide area communication processing unit F4 may be provided to various ECUs over the LAN.

The reception data management unit F5 stores the vehicle data of the other vehicle acquired by the dedicated short range communication processing unit F3 and the wide area communication processing unit F4 in the memory M1 in association with the vehicle ID of the other vehicle. As a result, information on the other vehicles existing around the host vehicle is managed separately for each vehicle. For convenience, the vehicle data for each vehicle stored in the memory M1 is referred to as peripheral vehicle data.

Further, when the vehicle data is stored in the memory M1, the reception data management unit F5 compares the vehicle data stored in the memory M1 with the vehicle data to be stored, and if the same data has already been stored, duplicate data is not saved but discarded. This is because there is no need to store the duplicate data.

For example, when the vehicle data is provided from the wide area communication processing unit F4, if the same data as the vehicle data is already stored in the memory M1, the vehicle data provided from the wide area communication processing unit F4 is discarded.

In this case, the same data is data in which the vehicle IDs coincide with each other and the data generation times also coincide with each other. The case where the same data as the vehicle data provided from the wide area communication processing unit F4 has already been stored in the memory M1 means that the same vehicle data is provided from the dedicated short range communication processing unit F3 before the wide area communication processing unit F4. It is needless to say that even when the vehicle data is provided from the dedicated short range communication processing unit F3, the same processing is executed to avoid saving of the duplicate data.

In the present embodiment, as a more preferable mode, when certain vehicle data is stored, the reception data management unit F5 records whether an acquisition path of the vehicle data is a direct vehicle-to-vehicle communication or an indirect vehicle-to-vehicle communication, with the use of a flag or the like. For example, in the case of storing the vehicle data provided from the dedicated short range communication processing unit F3, the reception data management unit F5 sets a flag indicating the data acquired by the direct vehicle-to-vehicle communication to ON. Further, in the case of storing the vehicle data provided from the wide area communication processing unit F4, the reception data management unit F5 turns on a flag indicating the data acquired by the indirect vehicle-to-vehicle communication. The reception data management unit F5 may turn on the respective flags for the data that can be acquired by both of those paths.

The peripheral vehicle determination unit F6 determines whether there is another vehicle in a predetermined range (hereinafter, peripheral range) that can be regarded as the periphery of the host vehicle, or not, based on the peripheral vehicle data stored in the memory M1. In other words, the peripheral vehicle determination unit F6 is a functional block that determines whether there is another vehicle around the host vehicle, or not, in other words, whether there is a peripheral vehicle, or not. The range that is the periphery of the host vehicle may be appropriately designed. In this case, as an example, a range obtained by a combination of a range in which the direct vehicle-to-vehicle communication can be implemented with a range in which the indirect vehicle-to-vehicle communication can be implemented is regarded as the peripheral range for the host vehicle.

The peripheral vehicle determination unit F6 determines whether the vehicle data packet of another vehicle has been received within a predetermined time (hereinafter referred to as a determination time) from the present time. More specifically, when the peripheral vehicle determination unit F6 has not received the vehicle data packet of another vehicle within a determination time from the present time, the peripheral vehicle determination unit F6 determines that no other vehicle is present around the host vehicle. On the other hand, when the peripheral vehicle determination unit F6 has received the vehicle data packet of another vehicle within the determination time, the peripheral vehicle determination unit F6 determines that the other vehicle is present around the host vehicle.

The determination time used in this situation may be appropriately designed. However, it is preferable that the determination time is set to be longer than one time as long as the first cycle Tw1. For example, the determination time may be set to be 1.5 times as long as the first cycle Tw1 or the like.

<Wide Area Transmission Cycle Control Process>

Figure 3:
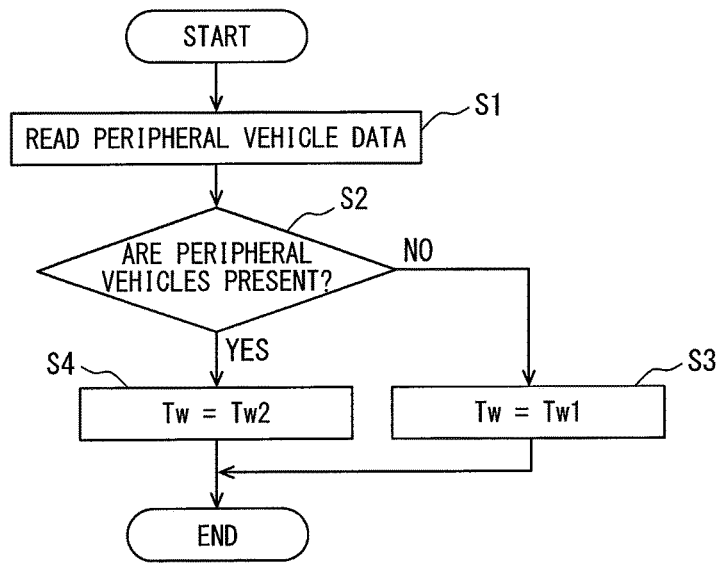
FIG. 3 is a flowchart illustrating a wide area transmission cycle control process.

Next, a wide area transmission cycle control process performed by the communication control unit 13 will be described with reference to a flowchart shown in FIG. 3. The wide area transmission cycle control process controls the wide area transmission cycle Tw. The wide area transmission cycle control process may be started sequentially (for example, every 100 milliseconds) while a power supply (for example, an ignition power supply) of the vehicle is on. Alternatively, the wide area transmission cycle control process may be started at a timing when the wide area communication processing unit F4 outputs the wide area vehicle data packet to the wide area communication module 12.

First, in Step S1, the peripheral vehicle determination unit F6 accesses the memory M1, reads the peripheral vehicle data, and proceeds to Step S2. In Step S2, the peripheral vehicle determination unit F6 determines whether another vehicle is present around the host vehicle based on the peripheral vehicle data read in Step S1, or not. If it is determined that the other vehicle is not present around the host vehicle, a negative determination is made in Step S2 and the flow proceeds to Step S3. On the other hand, If it is determined that the other vehicle is present around the host vehicle, an affirmative determination is made in Step S2 and the flow proceeds to Step S4.

In Step S3, the wide area communication processing unit F4 sets the wide area transmission cycle Tw to the first cycle Tw1 and terminates the present flow. If the wide area transmission cycle Tw has already been set to the first cycle Tw1, it is sufficient to keep the setting as it is.

In Step S4, the wide area communication processing unit F4 sets the transmission cycle to the second cycle Tw2 and terminates the present flow. If the wide area transmission cycle Tw has already been set to the second cycle Tw2, it is sufficient to keep the setting as it is.

Figure 4:
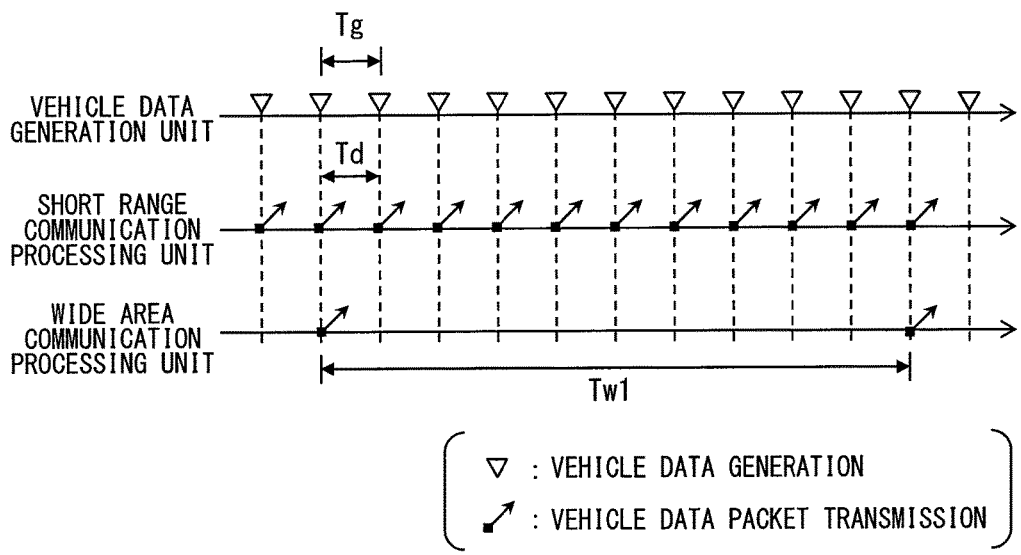
FIG. 4 is a diagram illustrating the operation of a communication control unit when a wide area transmission cycle is set to a first cycle.

FIG. 4 is a view showing the respective operations of the vehicle data generation unit F2, the dedicated short range communication processing unit F3, and the wide area communication processing unit F4 when the wide area transmission cycle Tw is set to the first cycle Tw1. An axis of abscissa represents the passage of time. Downward triangles in the figure indicate timings at which the vehicle data generation unit F2 generates the vehicle data. Arrows provided on the axis of abscissa corresponding to the dedicated short range communication processing unit F3 and the wide area communication processing unit F4 indicate timings at which the respective communication processing units transmit the vehicle data packets.

As shown in FIG. 4, the dedicated short range communication processing unit F3 transmits the vehicle data packet in synchronization with the generation of the vehicle data by the vehicle data generation unit F2. On the other hand, when the wide area transmission cycle Tw is set to the first cycle Tw1, the wide area communication processing unit F4 transmits the vehicle data packet once each time the dedicated short range communication processing unit F3 transmits the vehicle data packet 10 times. In the vehicle data packet transmitted by the wide area communication processing unit F4, the same vehicle data as that of the vehicle data packet transmitted by the dedicated short range communication processing unit F3 is stored at the same timing.

Figure 5:
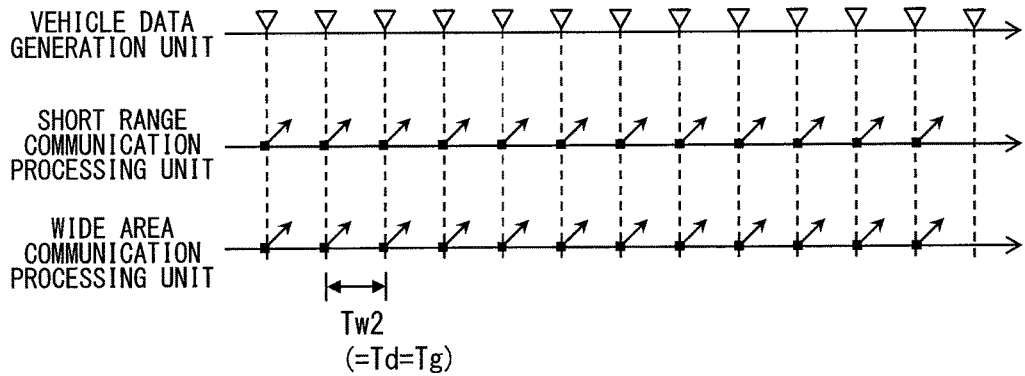
FIG. 5 is a diagram illustrating the operation of the communication control unit when the wide area transmission cycle is set to a second cycle.

FIG. 5 is a view showing the respective operations of the vehicle data generation unit F2, the dedicated short range communication processing unit F3, and the wide area communication processing unit F4 when the wide area transmission cycle Tw is set to the second cycle Tw2. The symbols in the figure have the same meanings as those in FIG. 4.

As shown in FIG. 5, the wide area communication processing unit F4 in the case where the wide area transmission cycle Tw is set to the second cycle Tw2 transmits the vehicle data packet at the same frequency as that of the dedicated short range communication processing unit F3. In other words, the wide area communication processing unit F4 implements information transmission to the other vehicles more densely than that when the wide area transmission cycle Tw is set to the first cycle Tw1.

<Overview of Embodiment>

With the configuration described above, when it is determined by the peripheral vehicle determination unit F6 that there is no other vehicle around the host vehicle, the wide area transmission cycle Tw is set to the first cycle Tw1. When it is determined by the peripheral vehicle determination unit F6 that there is another vehicle around the host vehicle, the wide area transmission cycle Tw is set to the second cycle Tw2.

The first cycle Tw1 is set to a relatively larger value as compared with the dedicated short range transmission cycle Td and the second cycle Tw2 from the viewpoint of a reduction in the communication traffic. In order to realize the real-time property comparable to that of the direct vehicle-to-vehicle communication in the indirect vehicle-to-vehicle communication, in other words, in order to achieve real-time information sharing to the same extent as that of the direct vehicle-to-vehicle communication, the second cycle Tw2 is set to a value approximately comparable to that of the dedicated short range transmission cycle Td.

That is, in the case where there is no other vehicle around the host vehicle, the wide area communication processing unit F4 sets the wide area transmission cycle Tw to a relatively short value. On the other hand, in the case where there is another vehicle around the host vehicle, the wide area communication processing unit F4 sets the wide area transmission cycle Tw to a relatively long value. The dedicated short range communication processing unit F3 sequentially transmits the dedicated short range vehicle data packets in a predetermined dedicated short range transmission cycle Td regardless of the determination results of the peripheral vehicle determination unit F6.

Therefore, according to the configuration described above, when there is another vehicle around the host vehicle, the transmission of the vehicle data is performed relatively densely by both of the direct vehicle-to-vehicle communication and the indirect vehicle-to-vehicle communication. Therefore, even if the communication quality of the direct vehicle-to-vehicle communication is deteriorated due to shadowing or the hidden terminal, sharing of the vehicle information in real time can be maintained by the indirect vehicle-to-vehicle communication.

Further, when there is no other vehicle around the host vehicle, the wide area transmission cycle is set to the first cycle Tw1 which is relatively long. Lengthening the wide area transmission cycle Tw corresponds to a reduction in a frequency at which the communication is implemented over the wide area communication network 3, thereby being capable of reducing the communication traffic and the communication charges. When there is no other vehicle in the peripheral range of the host vehicle, the vehicle data of the host vehicle is not used by other vehicles. For that reason, there is little need to frequently transmit the vehicle data. The periodical transmission of the vehicle data is carried out at the same interval as that when there is another vehicle around the host vehicle by the direct vehicle-to-vehicle communication over no wide area communication network 3.

Therefore, if there is no other vehicle around the host vehicle, even if the wide area transmission cycle Tw is lengthened, there is little possibility that the real time property of information sharing between the vehicles is impaired. In other words, according to the configuration described above, the communication charges generated by using the wide area communication network 3 can be reduced while realizing sharing of the vehicle information in real time.

Although the embodiments of the present disclosure have been described above, the present disclosure is not limited to the embodiments described above, and various modifications to be described below are also encompassed in a technical scope of the present disclosure. Various modifications can be implemented in appropriate combination. Furthermore, various modifications other than the following examples can be made without departing from the spirit of the present disclosure. For example, the communication control unit 13 may include a part of the functions of the locator 30.

The members having the same functions as those in the members described in the above embodiment are denoted by the identical reference numerals, and a description of the same members will be omitted. Further, when referring to only a part of the configuration, the configuration of the embodiment described above can be applied to other portions.

[Modification 1]

In the embodiment described above, as an example, the mode of determining that another vehicle is present around the host vehicle when the vehicle data packet of another vehicle is received within the determination time from the present has been exemplified, but the present disclosure is not limited to the above configuration.

When a distance between the position of the other vehicle indicated by the received vehicle data and the position of the host vehicle at a reception time point of the vehicle data is equal to or longer than a predetermined periphery determination distance, it may be determined that the other vehicle is not present around the host vehicle. In other words, even when the vehicle data packet of the other vehicle has been received by the indirect vehicle-to-vehicle communication or the direct vehicle-to-vehicle communication, if the distance between the other vehicle and the host vehicle is equal to or longer than the periphery determination distance, it may be determined that there is no other vehicle around the host vehicle. This corresponds to handling of a range within a predetermined periphery determination distance from the host vehicle as a predetermined range.

The periphery determination distance to be introduced in Modification 1 is a parameter that functions as a threshold for determining whether to consider the other vehicle directly or indirectly communicating with the host vehicle as the other vehicle existing around the host vehicle, or not. The periphery determination distance may be the same parameter as that of the transfer vehicle-to-vehicle distance employed by the center 2 or may be defined as a separate independent parameter. Further, the periphery determination distance may be adjusted according to the content of the vehicle control to be executed by the host vehicle based on the vehicle data of the other vehicle.

Examples of the contents of the vehicle control to be executed based on the vehicle data of the other vehicle include a lane change, a right or left turn, a following traveling, information provision to a driver, and the like. For example, when the following traveling is carried out, a value shorter than that when the lane change or the like is implemented can be adopted as the periphery determination distance. The periphery determination distance corresponding to the control content may be appropriately designed.

[Modification 2]

Figure 6:
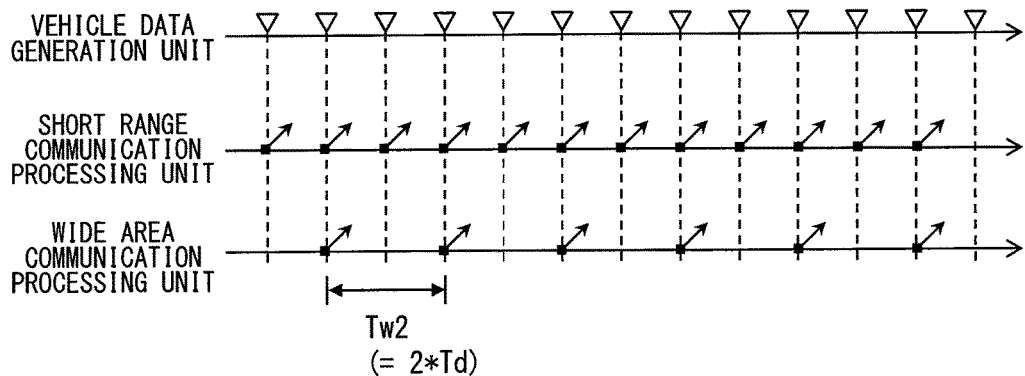
FIG. 6 is a diagram illustrating another mode of the second cycle.
Figure 7:
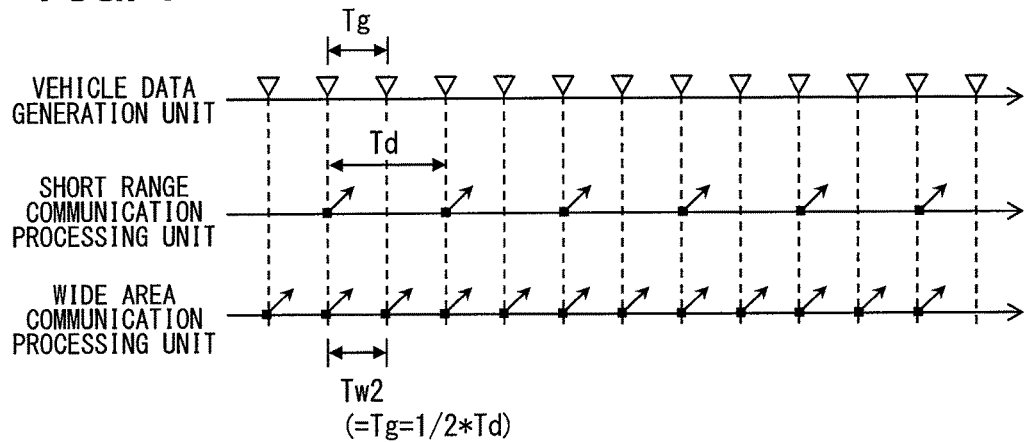
FIG. 7 is a diagram illustrating still another mode of the second cycle.

In the embodiment described above, the mode in which the second cycle Tw2 is set to the same value as that in the dedicated short range transmission cycle Td, but the present disclosure is not limited to the above configuration. For example, as shown in FIG. 6, the second cycle Tw2 may be twice as long as the dedicated short range transmission cycle Td. Further, as shown in FIG. 7, the second cycle Tw2 may be half the dedicated short range transmission cycle Td. In other words, the second cycle Tw2 may be set to be shorter than the dedicated short range transmission cycle Td. In that case, the generation cycle Tg may be set to a value equal to the second cycle Tw2.

Figure 8:
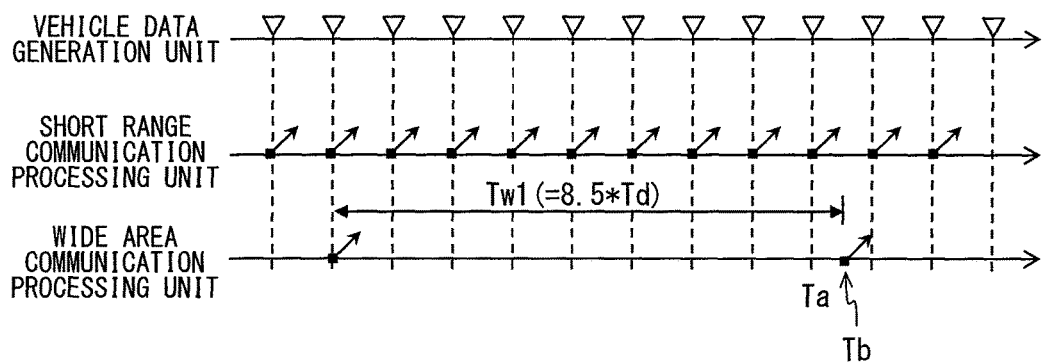
FIG. 8 is a diagram illustrating still yet another mode of the second cycle.

In addition, the wide area vehicle data packet may be generated so as to transmit the same vehicle data as that of the dedicated short range vehicle data packet, and if a constraint on the wide area vehicle data packet is satisfied, the first cycle Tw1 and the second cycle Tw2 used as the wide area transmission cycle Tw may not be necessarily an integral multiple of the dedicated short range transmission cycle Td. For example, as shown in FIG. 8, the first cycle Tw1 may be set to 8.5 times as long as the dedicated short range transmission cycle Td. In that case, the vehicle data packet transmitted by the wide area communication processing unit F4 at a time Tb may include the vehicle data accommodated in the vehicle data packet transmitted by the dedicated short range communication processing unit F3 just before the vehicle data packet. That is, the vehicle data packet has only to include the vehicle data generated at a time Ta.

[Modification 3]

In the embodiment described above, the mode in which the wide area communication processing unit F4 changes the wide area transmission cycle based on the presence or absence of the peripheral vehicle has been exemplified, but the present disclosure is not limited to the above configuration. The wide area communication processing unit F4 may dynamically change the wide area transmission cycle Tw based on whether the communication quality of the direct vehicle-to-vehicle communication is equal to or higher than a predetermined permissible level, or not, in addition to the presence or absence of the peripheral vehicle. Such a mode is referred to as Modification 3. Modification 3 may be realized as follows, for example.

Figure 9:
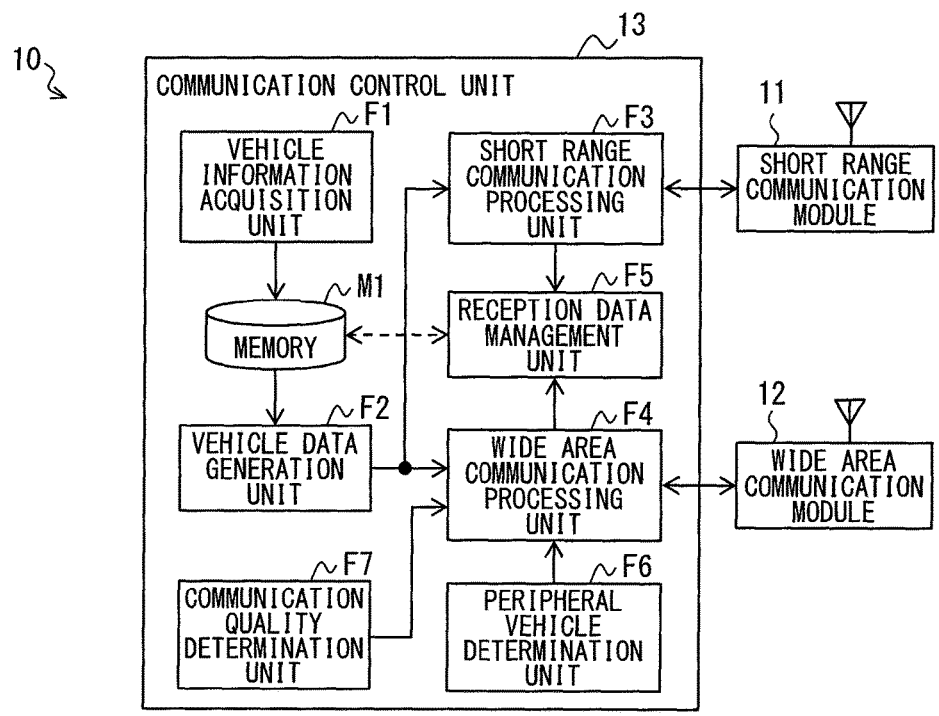
FIG. 9 is a block diagram illustrating a schematic configuration of a communication control unit according to Modification 3.

As shown in FIG. 9, the communication control unit 13 according to Modification 3 includes a communication quality determination unit F7 in addition to the various functions described above as an embodiment. The communication quality determination unit F7 may be realized by allowing a CPU to execute a communication control program or may be realized as hardware using one or more ICs or the like.

The communication quality determination unit F7 is a functional block that determines whether the communication quality of the direct vehicle-to-vehicle communication is equal to or higher than a predetermined permissible level, or not. Various methods can be adopted as a method of determining whether the communication quality of the direct vehicle-to-vehicle communication is equal to or higher than the permissible level, or not. A state in which the communication quality of the direct vehicle-to-vehicle communication is equal to or higher than the permissible level means a state in which the dedicated short range vehicle data packet transmitted from the peripheral vehicle can be normally received, in other words, a state in which a probability that the data fails to be received is equal to or less than a predetermined threshold (for example, 10%).

In that case, as an example, the communication quality determination unit F7 determines that the communication quality is lower than the permissible level when there is another vehicle that cannot receive the dedicated short range vehicle data packet among the other vehicles that should be present around the host vehicle. Further, when the dedicated short range vehicle data packet can be received from all the other vehicles that should exist around the host vehicle, it is determined that the communication quality of the direct vehicle-to-vehicle communication is equal to or higher than the permissible level. The other vehicle that should be present around the host vehicle may be specified based on the wide area vehicle data packet acquired by the indirect vehicle-to-vehicle communication.

It should be noted that it is preferable that the other vehicle used as the peripheral vehicle in the communication quality determination process is the other vehicle that is present within a range where the direct vehicle-to-vehicle communication with the host vehicle should be sufficiently implemented. For example, another vehicle existing within 100 m from the host vehicle may be adopted as a peripheral vehicle for determining communication quality. In other words, there is no need to use all of the other vehicles recognized by the indirect vehicle-to-vehicle communication as the peripheral vehicles.

The method of determining whether the communication quality of the direct vehicle-to-vehicle communication reaches the permissible level, or not, is not limited to the method described above. For example, it may be determined whether the communication quality is equal to or higher than the permissible level, or not, based on a received signal intensity (RSSI: received signal strength indication) of the dedicated short range vehicle data packet acquired by the direct vehicle-to-vehicle communication.

Specifically, the communication quality can be determined according to the RSSI by the following configuration and procedure. First, the dedicated short range communication module 11 provides the received dedicated short range vehicle data packet RSSI to the dedicated short range communication processing unit F3, and the dedicated short range communication processing unit F3 provides the dedicated short range vehicle data packet together with the RSSI of the dedicated short range vehicle data packet to the reception data management unit F5. The reception data management unit F5 stores the RSSI of the vehicle data packet acquired by the direct vehicle-to-vehicle communication in the memory M1 in association with the vehicle data of the other vehicle. It is to be noted that the RSSI can be specified with the use of a configuration known as an RSSI circuit.

In general, there is a correlation between a distance between the RSSI and a communication terminal, and the RSSI becomes larger as a distance between the communication terminals is shorter. For that reason, an assumed value of the RSSI according to the distance between the vehicles can be designed in advance. Data (hereinafter referred to as RSSI data) indicating the assumed value of the RSSI corresponding to the distance between the vehicles may be registered in advance in the ROM or the like as a part of a communication control program.

In such a configuration, the communication quality determination unit F7 determines that the communication quality of the direct vehicle-to-vehicle communication is lower than the permissible level when there is another vehicle whose RSSI of the actually received vehicle data packet is smaller by a predetermined threshold or more than the assumed value of the RSSI determined according to the distance of the other vehicle to the host vehicle. In addition, the communication quality determination unit F7 determines that the communication quality is equal to or higher than the permissible level when there is no other vehicle whose RSSI of the actually received vehicle data packet is smaller by the predetermined threshold or more than the assumed value of the RSSI determined according to the distance of the other vehicle to the host vehicle. According to the determination method described above, the communication quality of the direct vehicle-to-vehicle communication can be determined without the use of vehicle data acquired by the indirect vehicle-to-vehicle communication. Obviously, it is needless to say that the communication quality can be more accurately determined by determining the communication quality in combination with the method described above.

The case where the RSSI of the actually received vehicle data packet becomes smaller than the assumed value of the RSSI determined according to the distance between the vehicles is assumed to be a case where shadowing by a large-size vehicle occurs or a case where the periphery of the host vehicle is under a multipath vehicle-to-vehicle environment. Both situations are situations in which the communication quality of the direct vehicle-to-vehicle communication tends to be deteriorated (that is, a situation where the direct vehicle-to-vehicle communication is poor).

<Wide Area Transmission Cycle Control Process in Modification 3>

Figure 10:
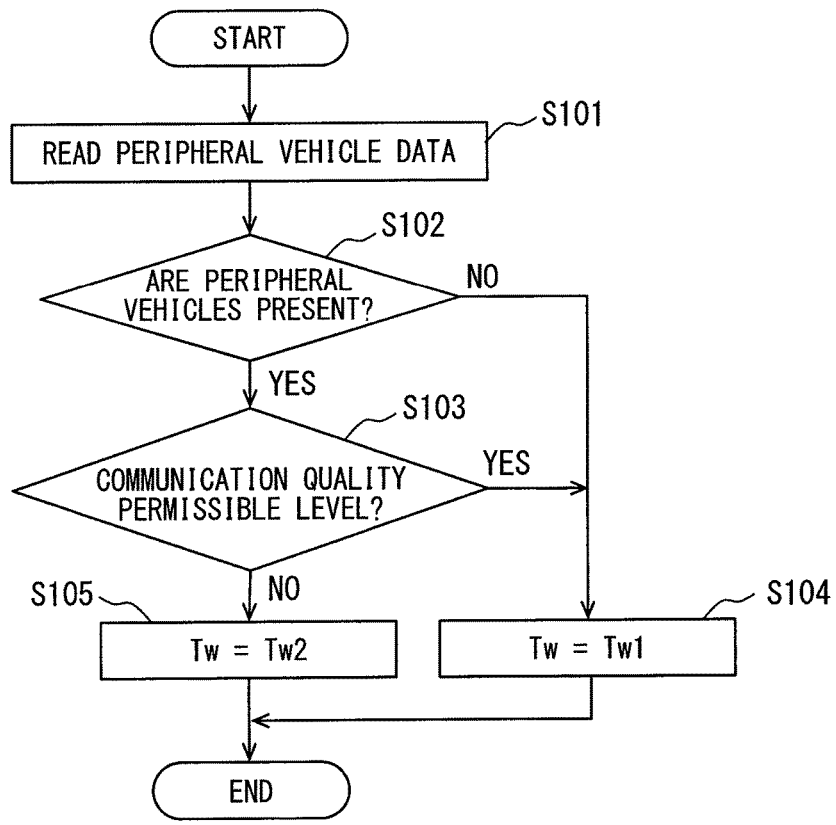
FIG. 10 is a flowchart illustrating a wide area transmission cycle control process which is implemented by the communication control unit in Modification 3.

Next, a wide area transmission cycle control process performed by the communication control unit 13 in Modification 3 will be described with reference to a flowchart shown in FIG. 10. First, in Step S101, the peripheral vehicle determination unit F6 accesses the memory M1, reads the peripheral vehicle data, and proceeds to Step S102. In Step S102, the peripheral vehicle determination unit F6 determines whether another vehicle is present around the host vehicle based on the peripheral vehicle data read in Step S101, or not. The method described in the first modification may be applied as a method of determining whether another vehicle is present around the host vehicle, or not. If it is determined that the other vehicle is present around the host vehicle, an affirmative determination is made in Step S102 and the flow proceeds to Step S103. If it is determined that the other vehicle is not present around the host vehicle, a negative determination is made in Step S102 and the flow proceeds to Step S104.

In Step S103, the communication quality determination unit F7 determines whether the communication quality of the direct vehicle-to-vehicle communication is equal to or higher than a predetermined permissible level, or not. If it is determined that the communication quality of the direct vehicle-to-vehicle communication is equal to or higher than the permissible level, an affirmative determination is made in step S103 and the flow proceeds to Step S104. On the other hand, if it is determined that the communication quality of the direct vehicle-to-vehicle communication is lower than the permissible level, a negative determination is made in Step S103 and the flow proceeds to Step S105.

In Step S104, the wide area communication processing unit F4 sets the wide area transmission cycle Tw to the first cycle Tw1 and terminates the present flow. If the wide area transmission cycle Tw has already been set to the first cycle Tw1, it is sufficient to keep the setting as it is.

In Step S105, the wide area communication processing unit F4 sets the transmission cycle to the second cycle Tw2 and terminates the present flow. If the wide area transmission cycle Tw has already been set to the second cycle Tw2, the setting has only to be maintained as it is.

<Overview of Modification 3>

In addition, when the peripheral vehicle determination unit F6 determines that there is no other vehicle around the host vehicle and the communication quality determination unit F7 determines that the communication quality of the direct vehicle-to-vehicle communication is equal to or higher than the permissible level, the wide area communication processing unit F4 in Modification 3 sets the wide area transmission cycle Tw to the first cycle Tw1. In addition, when the peripheral vehicle determination unit F6 determines that there is another vehicle around the host vehicle and the communication quality determination unit F7 determines that the communication quality of the direct vehicle-to-vehicle communication is lower than the permissible level, the wide area transmission cycle Tw is set to the second cycle Tw2.

In other words, the case in which the wide area communication processing unit F4 in Modification 3 sets the wide area transmission cycle Tw to a relatively short value means a case in which the communication quality of the direct vehicle-to-vehicle communication does not reach the permissible level although there is another vehicle around the host vehicle.

When the communication quality of the direct vehicle-to-vehicle communication is equal to or higher than the permissible level, the real time property of the information sharing between the vehicles is maintained by the direct vehicle-to-vehicle communication. Therefore, when the communication quality of the direct vehicle-to-vehicle communication reaches the permissible level, there is no need to shorten the wide area transmission cycle Tw, and it is preferable that the wide area transmission cycle Tw is longer from the viewpoint of reducing the communication traffic.

In other words, according to the configuration described above, since a scene of setting the wide area transmission cycle Tw to the second cycle Tw2 is more limited as compared with the embodiments described above, the communication charges can be further reduced.

In the case where the communication quality of the direct vehicle-to-vehicle communication has not reached the permissible level, there is a possibility that the dedicated short range vehicle data packet transmitted in the short distance from the other vehicle around the host vehicle cannot be received. Therefore, in the case where the communication quality of the direct vehicle-to-vehicle communication has not reached the permissible level, the wide area transmission cycle Tw is set to the relatively short value, thereby enabling the peripheral vehicle to acquire the vehicle information on the host vehicle in real time. Shortening the wide area transmission cycle Tw corresponds to an increase in the transmission frequency of the vehicle data packets to the wide area communication network 3 and implementation of information transmission to the other vehicles more densely. Also, since the other vehicles operate similarly to the host vehicle, the host vehicle can also acquire the real-time vehicle information on the peripheral vehicles. In other words, the real time property of information sharing of the vehicle data between the vehicles can be maintained in the same manner as that in the embodiments described above.

[Modification 4]

The method of determining the communication quality of the direct vehicle-to-vehicle communication by the communication quality determination unit F7 is not limited to the method disclosed in Modification 3. When a reception failure rate (hereinafter referred to as "packet loss rate" of the dedicated short range vehicle data packet is calculated for each of the other vehicles, and there is another vehicle having the packet loss rate equal to or higher than a predetermined threshold, it may be determined that the communication quality of the direct vehicle-to-vehicle communication is lower than the permissible level.

The packet loss rate for a certain other vehicle may be calculated as follows. First, when the reception data management unit F5 can receive the dedicated short range vehicle data packet from another vehicle, the reception data management unit F5 registers a reception time of the dedicated short range vehicle data packet in the memory M1 as a reception history in advance. In other words, the memory M1 stores data (hereinafter referred to as "direct reception history data") indicating the reception history for each vehicle.

When the communication quality determination unit F7 can receive the wide area vehicle data packet from another vehicle, the communication quality determination unit F7 specifies the number of times (hereinafter referred to as "the number of successful receptions") by which the dedicated short range vehicle data packet transmitted in the dedicated short range from the other vehicle can be received within past one second from the reception time point of the wide area vehicle data packet based on the direct reception history data.

An expected value (hereinafter referred to as "expected reception value") of the number of times by which the vehicle data packet transmitted from another vehicle by the direct vehicle-to-vehicle communication is received in one second is obtained by dividing 1 second by the dedicated short range transmission cycle Td. More specifically, since the dedicated short range transmission cycle Td is set to 0.1 seconds in this example, the expected reception value is 10.

The number of unsuccessful receptions, which is the number by which the reception of the vehicle data packets transmitted from a certain other vehicle by the direct vehicle-to-vehicle communication is unsuccessful, is obtained by subtracting the number of successful receptions for a certain other vehicle from the expected reception value. Further, a value obtained by dividing the number of unsuccessful receptions for the certain other vehicle by the expected reception value corresponds to the packet loss rate for the other vehicles.

In other words, when acquiring the wide area vehicle data packet of a certain other vehicle, the communication quality determination unit F7 specifies the number of successful receptions from the direct reception history data of the other vehicle, and calculates the packet loss rate for the other vehicle based on the specified number of successful receptions and the expected reception value. The packet loss rate may be expressed as a percentage. In this example, the value obtained by dividing the number of unsuccessful receptions by the expected reception value is used without being converted to the percentage as it is.

When the packet loss rate calculated in this way is equal to or lower than a predetermined threshold (for example, 0.2), it may be determined that the communication quality is lower than the permissible level. The threshold (hereinafter referred to as "loss rate threshold") for determining whether the communication quality is equal to or higher than the permissible level, or not, based on the packet loss rate may be set to a value corresponding to a distance between the host vehicle and the other vehicle to be subjected to the determination process. This is because the packet loss rate tends to rise more as the distance between the vehicles increases more.

[Modification 5]

When changing the wide area transmission cycle Tw from the first cycle Tw1 to the second cycle Tw2 based on the determination result of the peripheral vehicle determination unit F6, the communication control unit 13 may transmit over the wide area a communication packet (hereinafter referred to as "second cycle request packet") for requesting the peripheral vehicles to set the wide area transmission cycle Tw to the second cycle Tw2. The generation and transmission of the second cycle request packet are implemented by the wide area communication processing unit F4.

The second cycle request packet transmitted by the wide area communication processing unit F4 in cooperation with the wide area communication module 12 is transferred to the peripheral vehicle by the center 2. Upon receiving the second cycle request packet from, for example, the vehicle Ma, the center 2 identifies the peripheral vehicles of the vehicle Ma and transfers the second cycle request packet to the identified peripheral vehicles. When the wide area communication processing unit F4 of each vehicle system 1 receives the second cycle request packet, the wide area communication processing unit F4 sets the wide area transmission cycle Tw to the second cycle Tw2.

When the wide area transmission cycle Tw is set to the second cycle Tw2 with the reception of the second cycle request packet as a trigger, the wide area communication processing unit F4 does not perform the transmission of the second cycle request packet. This is because if the second cycle request packet is transmitted even when the wide area transmission cycle Tw is set to the second cycle Tw2 with the reception of the second cycle request packet, the second cycle request packet is diffused in a chain.

According to the configuration disclosed as Modification 5, when the host vehicle determines that the communication quality of the direct vehicle-to-vehicle communication is lower than the permissible level, the host vehicle can also transmit the vehicle data packet to the peripheral vehicle in the second cycle Tw2.

The wide area communication processing unit F4 transmits over the wide area the communication packet (hereinafter referred to as a return permission packet) for permitting the wide area transmission cycle Tw to return to the first cycle Tw1, when the communication quality determination unit F7 determines that the communication quality of the direct vehicle-to-vehicle communication is equal to or higher than the permissible level after having transmitted the second cycle request packet.

When receiving the second cycle request packet, the wide area communication processing unit F4 registers information (for example, vehicle ID) indicating a transmission source of the communication packet in the memory M1 as a request source vehicle in advance. When receiving the return permission packets from all of the request source vehicles, the wide area communication processing unit F4 returns the wide area transmission cycle Tw from the second cycle Tw2 to the first cycle Tw1. Incidentally, there is a high possibility that some of the transmission source vehicles of the second cycle request packets which could not thereafter receive the wide area vehicle data packets are no longer the peripheral vehicles for the host vehicle. For that reason, the vehicles that can no longer receive the wide area vehicle data packets may be deleted from registration as the request source vehicles.

[Modification 6]

In Modification 5 described above, the mode of transmitting the return permission packet when the communication quality determination unit F7 determines that the communication quality of the direct vehicle-to-vehicle communication is equal to or higher than the permissible level has been exemplified, but the present disclosure is not limited to the above mode. For example, it may be determined whether to transmit the return permission packet, or not, based on a positional relationship with an intersection. Such a mode will be described below as Modification 6.

First, as a premise, the locator 30 in Modification 6 sequentially identifies a road on which the host vehicle is traveling (hereinafter referred to as "host vehicle traveling road") based on the mapping result for the host vehicle. Then, the locator 30 sequentially provides the road map information (hereinafter referred to as "traveling road information") relating to the identified host vehicle traveling road to the communication control unit 13. The traveling road information may include positions of road connection points existing on the host vehicle traveling road and the information (hereinafter referred to as road shape information) indicating a road shape of the host vehicle traveling road. In this example, the road connection point is an intersection, a merging point to an expressway main road, and the like.

Figure 13:
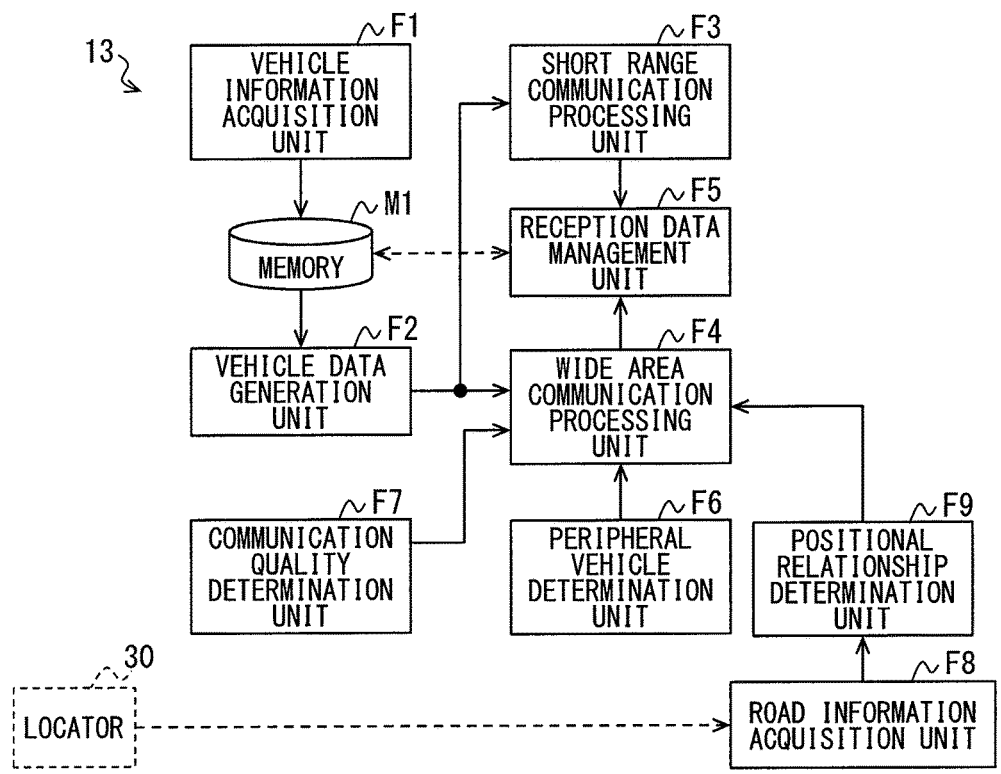
FIG. 13 is a block diagram illustrating a modification of a configuration of a communication control unit.

As shown in FIG. 13, the communication control unit 13 according to Modification 6 includes a road information acquisition unit F8 and a positional relationship determination unit F9 in addition to the various functions described above. Each of the road information acquisition unit F8 and the positional relationship determination unit F9 may be realized by allowing a CPU to execute a communication control program or may be realized as hardware using one or more ICs or the like.

The road information acquisition unit F8 acquires the traveling road information from the locator 30. The acquired traveling road information is provided to the positional relationship determination unit F9.

Based on the position information on the road connection points included in the traveling road information acquired by the road information acquisition unit F8 and the current position of the host vehicle, the positional relationship determination unit F9 identifies a distance (hereinafter referred to as "forward connection point distance") to a road connection point (hereinafter referred to as "nearest connection point") existing at a closest position from the host vehicle among the road connection points existing in front of the host vehicle, and a distance (hereinafter referred to as "backward connection point distance") from a road connection point existing at a closest position from the host vehicle among the road connection points existing at the rear of the host vehicle.

Then, the positional relationship determination unit F9 determines whether at least one of the forward connection point distance and the backward connection point distance is equal to or shorter than a predetermined cycle change distance Dth, or not. In other words, the positional relationship determination unit F9 determines whether the host vehicle exists in a range within the cycle change distance Dth from the road connection point, or not.

The cycle change distance Dth is a parameter for determining whether the current position of the host vehicle is in the vicinity of the road connection point, or not. The cycle change distance Dth may be a constant value previously designed or may be determined dynamically (in other words, adjusted) according to the traveling speed of the host vehicle. In this case, as a more preferable mode, the positional relationship determination unit F9 sets the cycle change distance Dth to a larger value as the traveling speed of the host vehicle is higher. For example, when the traveling speed of the host vehicle is equal to or less than a cruising speed (for example, 50 km/h) of the general road, the positional relationship determination unit F5 sets the cycle change distance Dth to 200 m, and when the traveling speed is equivalent to the cruising speed of the expressway (for example, 80 km/h), the positional relationship determination unit F5 sets the cycle change distance Dth to 400 m or the like. A specific value of the cycle change distance Dth corresponding to the traveling speed may be appropriately designed.

Then, when it is determined by the positional relationship determination unit F9 that both of the forward connection point distance and the backward connection point distance are equal to or longer than the cycle change distance Dth after transmitting the second cycle request packet, the wide area communication processing unit F4 transmits the return permission packet.

It is needless to say that the condition under which the wide area communication processing unit F4 transmits the return permission packet is not limited to the above condition. Then, when it is determined by the positional relationship determination unit F9 that both of the forward connection point distance and the backward connection point distance are equal to or longer than the cycle change distance Dth and it is determined by the communication quality determination unit F7 that the communication quality of the direct vehicle-to-vehicle communication is equal to or higher than the permissible level after transmitting the second cycle request packet, the wide area communication processing unit F4 transmits the return permission packet.

[Modification 7]

Figure 11:
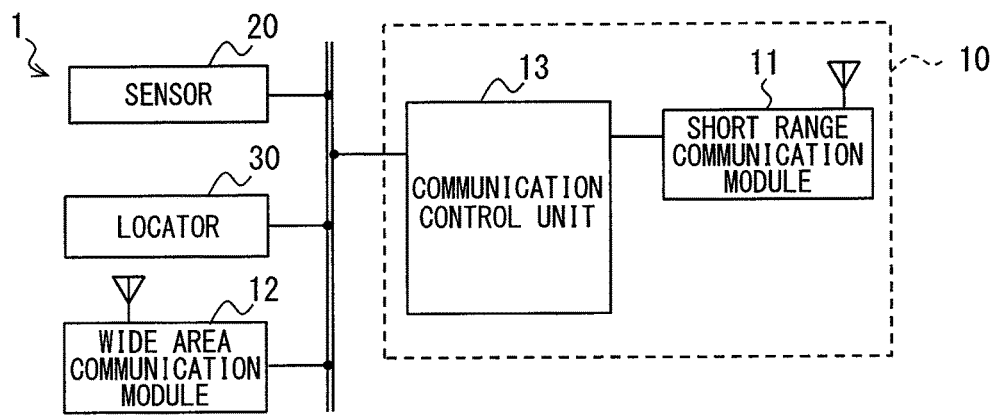
FIG. 11 is a block diagram illustrating one modification of the configuration of the vehicle system.

In the above description, the mode in which the wide area communication module 12 and the communication control unit 13 are housed in the same housing has been exemplified, but the present disclosure is not limited to the above configuration. As shown in FIG. 11, the wide area communication module 12 may be provided outside the communication unit 10 including the communication control unit 13, and the wide area communication module 12 and the communication control unit 13 may be configured to be connected to each other over a LAN.

In addition, the dedicated short range communication module 11 may be provided outside the communication unit 10 including the communication control unit 13, and the dedicated short range communication module 11 and the communication control unit 13 may be configured to be connected to each other over the LAN.

Figure 12:
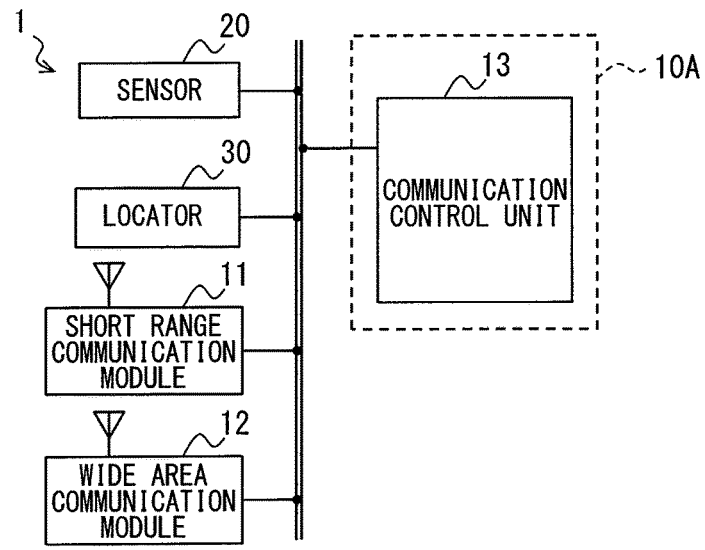
FIG. 12 is a block diagram illustrating another modification of the configuration of the vehicle system.

Further, as shown in FIG. 12, both of the dedicated short range communication module 11 and the wide area communication module 12 may be provided outside the unit 10A including the communication control unit 13. In other words, each of the dedicated short range communication module 11 and the wide area communication module 12 may be configured to be connected to the communication control unit 13 over the LAN.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication control device for vehicle comprising:
   a dedicated short range communication processing unit that executes a direct vehicle-to-vehicle communication, which is a direct vehicle-to-vehicle communication without passing through a wide area communication network, with a peripheral vehicle disposed around the vehicle in cooperation with a dedicated short range communication module for executing a direct wireless communication with an external device without passing through the wide area communication network;
   a wide area communication processing unit that executes an indirect vehicle-to-vehicle communication, which is an indirect vehicle-to-vehicle communication with passing through the wide area communication network, with the peripheral vehicle in cooperation with a wide area communication module for wirelessly communicating with the external device via the wide area communication network; and a vehicle data generation unit that generates vehicle data indicating a traveling state of the vehicle based on a detection result of a sensor mounted on the vehicle, wherein:

the dedicated short range communication processing unit wirelessly transmits a communication packet including the vehicle data from the dedicated short range communication module in a predetermined dedicated short range transmission cycle; and the wide area communication processing unit performs a process of transmitting the communication packet including the vehicle data to the peripheral vehicle via the wide area communication module and the wide area communication network in a predetermined wide range transmission cycle;

the communication control device further comprising:

a peripheral vehicle determination unit that determines whether an other vehicle corresponding to the peripheral vehicle is disposed within a predetermined area determined with reference to a position of the vehicle, based on the vehicle data acquired by the dedicated short range communication processing unit and the wide area communication processing unit, wherein:

the wide area communication processing unit selects a predetermined first wide area transmission cycle longer than the dedicated short range transmission cycle as the wide area transmission cycle when the peripheral vehicle determination unit determines that no other vehicle is disposed within the predetermined area; and the wide area communication processing unit selects a predetermined second wide area transmission cycle equal to or shorter than the dedicated short range transmission cycle as the wide area transmission cycle when the peripheral vehicle determination unit determines that the other vehicle is disposed within the predetermined area.

2. The communication control device according to claim 1, further comprising:

a communication quality determination unit that determines whether a communication quality of the direct vehicle-to-vehicle communication provided by the dedicated short range communication processing unit is equal to or higher than a predetermined permissible level, wherein:

the wide area communication processing unit selects the second wide area transmission cycle as the wide area transmission cycle when the peripheral vehicle determination unit determines that the other vehicle is disposed within the predetermined area and the communication quality determination unit determines that the communication quality of the direct vehicle-to-vehicle communication is lower than the predetermined permissible level.

3. The communication control device according to claim 2, wherein:

the wide area communication processing unit selects the first wide area transmission cycle as the wide area transmission cycle in a case where the communication quality determination unit determines that the communication quality of the direct vehicle-to-vehicle communication is equal to or higher than the permissible level even when the peripheral vehicle determination unit determines that the other vehicle is disposed within the predetermined area.

4. The communication control device according to claim 2, wherein:

the communication quality determination unit determines whether the communication quality of the direct vehicle-to-vehicle communication is equal to or higher than the permissible level, based on a received signal intensity or a packet loss rate of the communication packet acquired by the direct vehicle-to-vehicle communication.

5. The communication control device according to claim 2, wherein:

the wide area communication processing unit transmits a second cycle request packet, which is a communication packet for requesting the peripheral vehicle to set the wide area transmission cycle to the second wide area transmission cycle, to the peripheral vehicle via the indirect vehicle-to-vehicle communication when the wide area communication processing unit changes the wide area transmission cycle from the first wide area transmission cycle to the second wide area transmission cycle based on determination of the peripheral vehicle determination unit that the other vehicle is disposed within the predetermined area.

6. The communication control device according to claim 5, wherein:

the wide area communication processing unit sets the wide area transmission cycle to the second wide area transmission cycle when the wide area communication processing unit receives the second cycle request packet via the indirect vehicle-to-vehicle communication.

7. The communication control device according to claim 6, wherein the wide area communication processing unit transmits a return permission packet, which is a communication packet for permitting the wide area transmission cycle to return to the first wide area transmission cycle, when the communication quality determination unit determines that the communication quality of the direct vehicle-to-vehicle communication is equal to or higher than the permissible level after transmitting the second cycle request packet.

8. The communication control device according to claim 7, further comprising:

a road information acquisition unit that acquires road information including a position of a road connection point at which a host vehicle traveling road on which the vehicle is traveling is connected to another road; and a positional relationship determination unit that determines whether a distance between the vehicle and the road connection point is equal to or longer than a predetermined cycle change distance, based on the road information acquired by the road information acquisition unit, wherein:

the wide area communication processing unit transmits the return permission packet when the positional relationship determination unit determines that the distance from the road connection point is equal to or longer than the predetermined cycle change distance and the communication quality determination unit determines that the communication quality of the direct vehicle-to-vehicle communication is equal to or higher than the permissible level after transmitting the second cycle request packet.

9. The communication control device according to claim 7, wherein:
   the wide area communication processing unit sets the wide area transmission cycle to the first wide area transmission cycle when receiving the return permission packet from all of vehicles corresponding to transmission sources of received second cycle request packet when the wide area transmission cycle is set to the second wide area transmission cycle based on reception of the second cycle request packet.

10. The communication control device according to claim 1, wherein:
    the vehicle data includes position information indicating a current position, a traveling speed, and a traveling direction of the vehicle, and a generation time at which the vehicle data is generated.

* * * * *